United States Patent [19]

Teague

[11] Patent Number: 5,381,962

[45] Date of Patent: Jan. 17, 1995

[54] REMOTE CONTROLLED SPRAYING DEVICE

[75] Inventor: Jim C. Teague, Grand Rapids, Mich.

[73] Assignee: Hydro-Chem Systems, Inc., Grand Rapids, Mich.

[21] Appl. No.: 169,328

[22] Filed: Dec. 17, 1993

Related U.S. Application Data

[63] Continuation-in-part of Ser. No. 988,749, Dec. 10, 1992.

[51] Int. Cl.$^6$ ............................. B05B 7/02; B05B 9/01; B05B 12/00
[52] U.S. Cl. ........................................ 239/526; 239/525
[58] Field of Search ............... 239/525, 526; 134/123; 340/825.72; 222/63, 179; 251/129.04; 137/606; 200/61.86

[56] References Cited

U.S. PATENT DOCUMENTS

| | | | |
|---|---|---|---|
| 3,322,350 | 5/1967 | Heinicke et al. | 134/123 X |
| 4,715,391 | 12/1987 | Scheller | 134/123 X |
| 4,848,383 | 7/1989 | Buhler | 134/123 |
| 4,850,536 | 7/1989 | Teranishi et al. | 239/526 X |
| 5,098,023 | 3/1992 | Burke | 134/123 X |
| 5,148,829 | 9/1992 | Deville | 251/129.04 X |
| 5,226,629 | 7/1993 | Millman et al. | 251/129.04 |

*Primary Examiner*—Andres Kashnikow
*Assistant Examiner*—Lesley D. Morris
*Attorney, Agent, or Firm*—John A. Waters

[57] ABSTRACT

A universal remote control mechanism for controlling a power spraying device comprises an electronic control contained within the nozzle housing of the sprayer. Membrane switches in the controller are actuated to cause radio wave signals to be generated and transmitted by an internal antenna. The radio signals are detected by a receiver which converts the radio signals into control signals for a main pumping unit. The radio waves may also control the introduction of various chemicals into the liquid solution by the main pumping unit. The nozzle also contains a deadman's switch for turning off the flow of liquid in case the unit is accidentally dropped. A delay feature lets the operator change hands without deactuating the system. The nozzle gun can be used for wired cable systems as well as for radio controlled systems.

14 Claims, 7 Drawing Sheets

REMOTE CONTROLLED SPRAYING DEVICE

CROSS REFERENCE TO RELATED APPLICATION

This is a continuation-in-part of application Ser. No. 07/988,749 filed Dec. 10, 1992 and still pending.

BACKGROUND OF THE INVENTION

This invention relates to a power spraying device. More particularly, it relates to a device for applying a liquid to a surface in which a wireless electronic control is contained within the nozzle mechanism of the sprayer. The electronic control emits a signal which is transmitted to a receiver via radio waves. The receiver converts the signal to a control signal which is used to control the operation of a pumping unit, thereby providing pressurized liquid to the nozzle with a hose.

The power spraying device may be used in a variety of applications, including but not limited to: paint application; pressure washing; aircraft deicing; fire fighting; animal disinfecting; and the application of pesticide or preservative to vegetable matter.

One type of industry for which the power spraying device is especially well suited is the pressure washing industry. Pressure washing is well known and is used to wash a variety of objects including but not limited to: vehicles which are too large to fit into a conventional car wash, boats, mobile homes, houses, and large buildings. The pressure wash pumping apparatus may be permanently fixed into a structure such as a large warehouse or alternatively contained within a van and transported to the wash site.

In conventional pressure washing systems, the liquid solution, which is usually pressurized at a main pumping unit, must be turned on and off. The solution may also be heated. The controls for these functions are usually found at the main pumping unit. Additionally, during a pressure wash, the composition of the liquid is usually varied. Different chemicals and chemical mixtures are combined in varying sequences to provide an optimum wash. It is also not uncommon for pressure washing devices to provide for two different types of soap, a rinse cycle, and a wax cycle. These chemical mixtures must also be controlled. The controls are usually found at the main pumping unit.

Because the hose is long and the structures to be washed are large, manually controlling the system at the main pumping unit is cumbersome. Either one person has to walk back and forth to the spraying unit or two people must be employed to efficiently use the power spraying device, one to operate the nozzle and the other to operate the controls.

To avoid the above mentioned problems, electrical controls have been placed at the handle of the nozzle mechanism. Such controls have been electrically connected to the main pumping unit by a conductive cable, which is either adjacent to the hose or employs the conductive braided jacket on the hose. There are several disadvantages to using an electrical cable. First, the cable must be made very durable to resist breakage. This can increase the weight and expense of the cable. Second, the electrical cable may break under the constant flexing and manipulation of the hose. This necessitates replacement of the entire hose which is very costly. Third, the insulation surrounding the electric cable may break allowing the cable to contact either the liquid in the hose or the liquid draining off the sprayed fixture, causing electrical malfunction.

Radio transmission of control signals from a remote transmitter by a hose operator to a receiver electrically connected to a main pumping unit has also been tried. However, in such systems the transmitter has been separate from the pressure washer and frequently has had limited functional capabilities. In one application the transmitter rests at a separate location from the pumping facility which is closer to the operator. Alternatively, the transmitter may be a garage door opener type of device attached to a belt worn by the operator. Both methods have limited capabilities and can create considerable inconvenience to the operator while allowing possible damage to the transmitter. The operator must separately manipulate the radio transmitter while maintaining control over the spray nozzle. However, the high pressure spray nozzle can require two hands to effectively control. Thus, the operator is compromised by the removal of at least one of his hands from the nozzle to manipulate the separate radio transmitter. The nozzle, under the high liquid pressure from the hose may break free from the operator's grip possibly damaging the equipment and injuring the operator.

An object of the present invention is provide a power spraying device in which a sophisticated multifunction radio controller is contained within the nozzle mechanism of the device. Another object of the invention is to reduce the weight and increase the reliability of the liquid solution delivery system which allows greater control by the operator while reducing fatigue. Another object of the invention is to provide an improved radio control apparatus for operating a power washer or the like. Still another object of the invention is to simplify operation of the device and increase the efficiency of operation.

Another object of the present invention is to provide an electronically operated nozzle controller that employs water resistant membrane switches and a membrane switch deadman's control that operates both as a trigger and a deadman's shut off control. A further object of the present invention is to provide a universal nozzle controller that can be used with new equipment or retrofitted on a wide variety of existing pressure washers, including washers that route control wires along the hose to the nozzle.

SUMMARY OF THE INVENTION

A remotely controlled pumping system for unidirectionally delivering a fluid from a pumping unit through a hose to a remote outlet nozzle mechanism includes a radio transmitter which is contained within the nozzle handle of the device and a receiver at the pumping unit for controlling pump operations. The radio transmitter transmits radio control signals in response to switches on the nozzle handle which are controlled by the operator. The radio signals are received by the radio receiver, which thereby controls the pumping module. The pumping module then pumps the fluid through the hose to the nozzle in response to the control signals received by the radio receiver. The signals transmitted from the radio transmitter in the nozzle handle can control pump operation and the amount of chemicals that are added to a liquid solution delivered by the pumping module. Multifunction operation is achieved by digital devices that modulate or code the radio signal in the transmitter with information from the manually operated switches and which convert the radio signal received by the receiver to operating instructions for the pumping module element. The transmitter is integrally incorporated into the handle for the nozzle and is operated by conveniently accessible switches on the handle.

In the preferred practice of the present invention, the radio-control unit mounted in the nozzle housing (which is also referred to as a gun herein) is actuated by electronic membrane switches, which are durable and relatively moisture proof. The membrane switches include an important and novel deadman's switch as well as an on/off switch and three chemical control switches. All of the switches are incorporated in a single membrane switch strip mounted on the hand grip portion of the handle or gun for convenient operation while holding the handle. The membrane switch strip is constructed so that the deadman's switch is more sensitive than the on/off and chemical additive switches. A very light touch is desirable for the deadman's switch, whereas a heavier, more positive actuation is desired for the other switches.

There are several important features of the electronic controls of the present invention. One important feature of the control unit is that it broadcasts a continuous control signal to the receiver in timed repetitive pulses. Thus, if the receiver does not detect one transmitted signal, it will still have a chance to receive the subsequent ones. Also, if the continuous signal is interrupted, after a delay of up to five and preferably three seconds the system shuts down. The system thus avoids the problem of a system remaining operational if the receiver does not detect a shut down signal. The time delay feature permits an operator to release the handle briefly to change hands without deactuating the sprayer. This continuous signal feature also reduces the chance of adverse effects from static or spurious signals. The deadman's switch deactuates the transmitter when it is deactuated. It could instead cause the transmitter to send a coded deactuation signal.

Another important aspect of the present invention is that the gun can be retrofitted for use with virtually any existing pressure washing equipment, including wired cable systems, as well as used with new systems. Special electronics and adapters make the unit virtually universally adaptable to any pressure washing system.

These and other features of the present invention are described below in connection with a description of preferred embodiments of the present invention.

BRIEF DESCRIPTION OF THE DRAWINGS

shows a sectional view of second embodiment of a nozzle handle containing the radio transmitter with toggle switches, a power supply, a spring loaded deadman's switch, and an antenna incorporated in the nozzle housing.

DETAILED DESCRIPTION OF THE PREFERRED EMBODIMENTS

Figure 1:
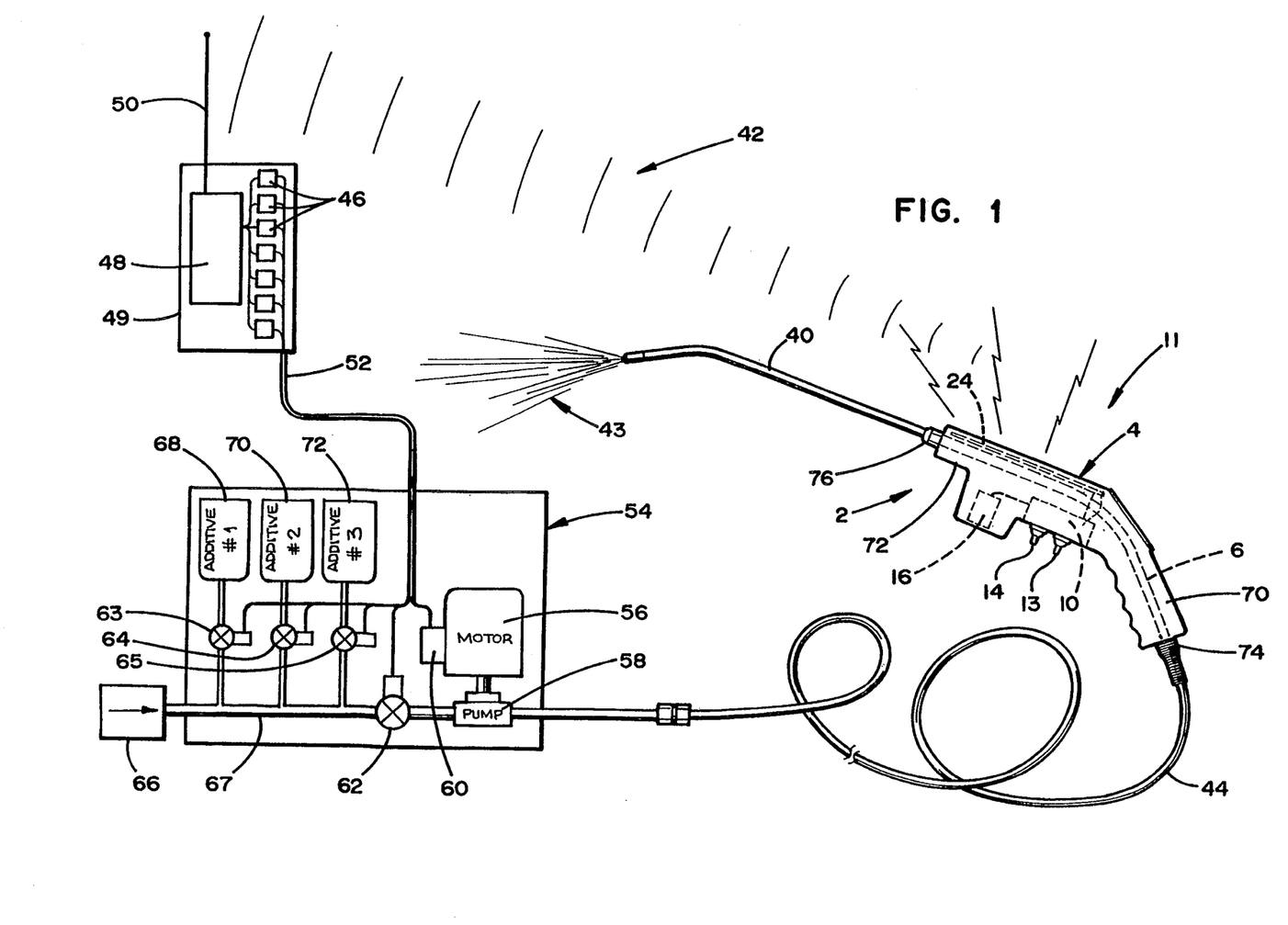
FIG. 1 is a schematic diagram of the power spraying system showing the transmitter nozzle, radio receiver, and pumping module.

Referring to the drawings and more particularly to FIG. 1, a radio controlled spraying system 11 is provided for unidirectionally delivering a liquid solution 43 to a surface to be contacted. The system comprises a hand held nozzle mechanism 2, which is connected to a pumping module 54 by a pressure hose 44. The system will be described for exemplary purposes in connection with a pressure washing system, but the system can be employed in other fluid pumping systems where a pumping unit is controlled from a remotely located hand held nozzle. The solution is pumped through fluid hose 44 to nozzle mechanism 2, which comprises a spray wand or accessory 40 attached to gun or nozzle handle or housing 4. A radio transmitter 10 is contained within the housing 4 of nozzle mechanism 2 and generates a carrier signal° Digital circuitry in the transmitter modulates the carrier signal with control signal information reflecting the state of actuating switches mounted on the handle. The transmitter transmits the modulated signal as radio wave 42.

The carrier signal of radio wave 42 is tuned to a predetermined frequency and is received by antenna 50 which is connected to radio receiver 48 in housing 49. The radio receiver includes digital logic circuitry that decodes the radio wave into control signal instructions which are then used to turn relays 46 on and off. The signals from relays 46 are then communicated to pumping module 54.

Pumping module 54 contains motor 56, which provides power to pump 58. Motor 56 may be electric, gas or diesel. The motor operation is controlled by motor relay 60. If the motor is a gas or diesel motor, the motor relay may be a starter relay, grounding relay, or a clutch relay. The flow of liquid is controlled by primary liquid solenoid 62. When solenoid 62 allows the fluid to pass, it is pumped from primary fluid source 66 via fluid passageway 67. While not limited thereto, the primary fluid source 66 may be a liquid storage tank, a municipal water system, a well, a lake or a stream.

Various chemicals such as soaps, detergents, anti-icing agents, anti-combustion chemicals, waxes, and paints may be introduced through chemical solenoids 63, 64, and 65. The spirit and scope of the present invention does not require three chemical solenoids. One, two, or more than three solenoids may be used depending upon the application. However, for power washing, the option of three chemical additives provides the most efficient means of varying the chemical content of the liquid. The three chemical solenoids 63, 64, and 65 respectively control the introduction of three chemicals from three chemical sources 68, 70, and 72 into fluid passageway 67. For power washing, the chemical sources may, for example, be small tanks of concentrated chemicals including different types of soap and possibly wax. Multi-wire cable 52 delivers the control signals which turn on and off motor relay 60, primary solenoid 62 and chemical solenoids 63, 64 and 65.

Relays 46 allow the electromagnetic radiation signals received by radio receiver 48 through antenna 50 to be converted to the control signals transferred to the pumping module through multi-wire cable 52. The electromagnetic radiation signals received by antenna 50 are transmitted by radio transmitter 10 contained in nozzle housing 4. While radio receiver 48 is shown in the drawings as a separate unit connected to pumping module 54 by multi-wire cable 52, this need not be the case. Alternatively, both receiver 48 and pumping module 54 may be contained within the same unit.

Figure 2:
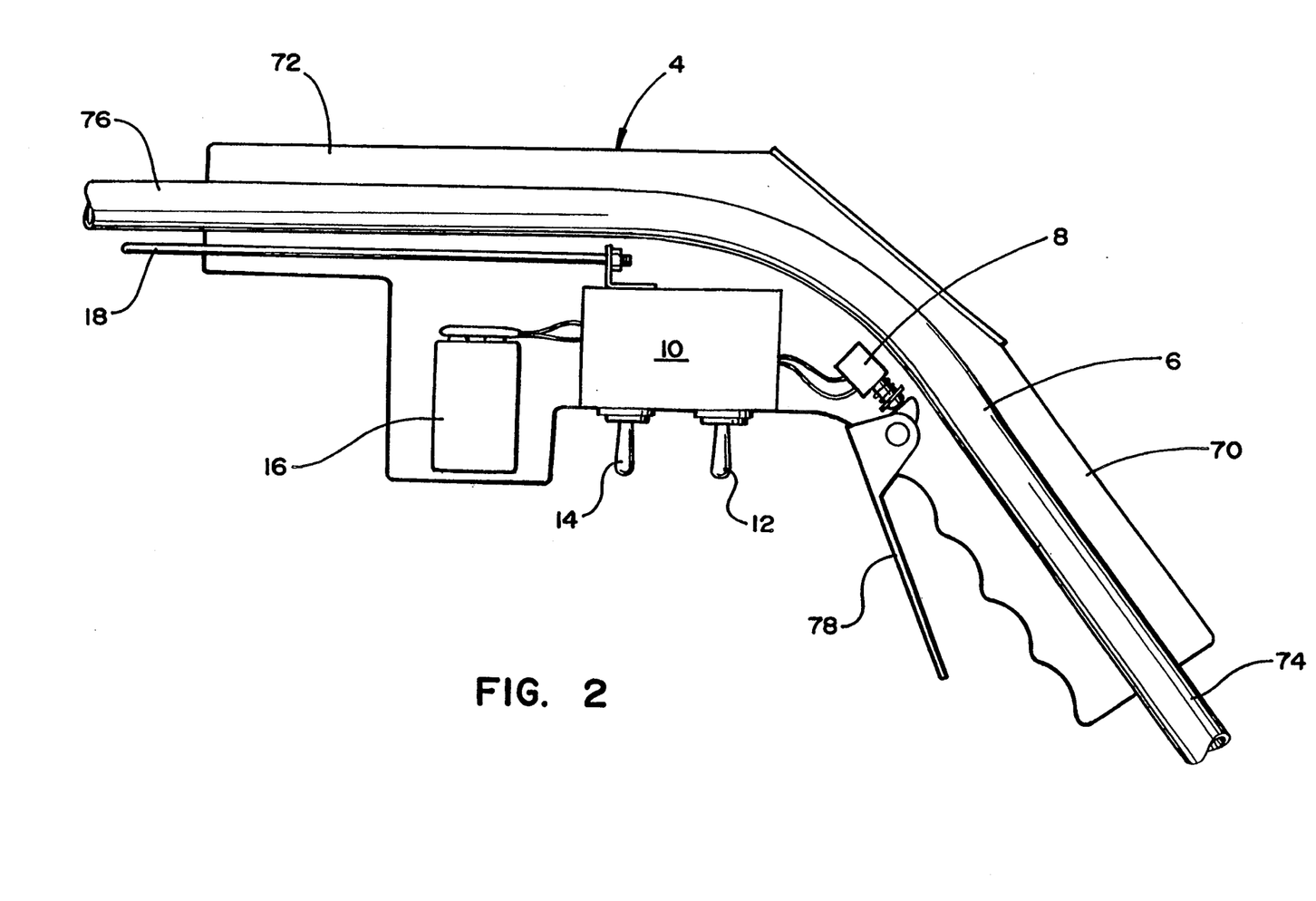

In reference to FIG. 2, a sectional view of nozzle housing 4 is provided. Nozzle housing 4 is a pistol-grip handle mechanism having a hand grip portion 70 attached at an angle to a barrel portion 72. A liquid tube 6 extends internally from an inlet 74 at the base of the handle grip to an outlet 76 in the outer end of the barrel. The outlet is attached to spray wand 40 or other nozzle accessory. The inlet of tubing 6 connects to fluid hose 44. The tubing may be made out of many materials, including PVC, but preferably is stainless steel. Alternatively, the tubing may be integrally formed in the nozzle housing 4 itself. The nozzle housing 4 may be made out of metal but preferably is formed out of a resilient, high density, high impact plastic. Antenna 18, radio transmitter 10 and power supply 16 are mounted in internal recesses in the housing. The housing either is formed in two separable sections or it includes access openings to provide access to the recesses for service or replacement of the battery and electronic components. Power supply 16 may be a replaceable battery such as a 9 volt battery or alternatively a rechargeable battery. Note also that in this embodiment, antenna 18 is partially exposed external to nozzle housing 4. This provides improved transmission of electromagnetic radiation signal 42. When the antenna is recessed in the housing, the housing should be formed of a radio signal transmissive plastic or the like.

Nozzle housing or handle 4 is constructed to fit easily in the hands of the operator. The operator may steady his hold on the nozzle mechanism by grasping the housing barrel externally near the battery storage area as well as grasping the hand grip at the deadman's switch 8.

Externally mounted in a trigger position on housing 4 is on/off switch 12 and chemical selector switch 14. On/off switch 12 turns primary liquid solenoid 62 on or off. However, switch 12 may also be used to turn off any component, including radio transmitter 10 or radio receiver 48 or motor relay 60. Chemical selector switch 14 is a three position switch that turns chemical solenoids 63, 64 and 65 on or off.

Spring loaded switch 8 is actuated by a lever 78 pivotally mounted on hand grip 70. The operator simply pulls lever 78 toward hand grip 70 to engage the switch while gripping the hand grip. This in turn opens primary solenoid valve 62. If the operator should accidently drop nozzle mechanism 2, switch 8 is automatically released as a result of its spring loaded characteristic and primary solenoid valve 62 is closed. This feature is especially important in power washing because the enormous pressure of the liquid will whip the nozzle around if left unattended. This may cause serious damage to persons or property.

In an alternative embodiment, deadman's switch 8 may electronically control the force of the liquid spray. The amount of depression of switch 8 may be detected by circuitry contained in radio transmitter 10 and relayed as velocity information to radio receiver 48. In turn, primary solenoid 62 would be a variable valve instead of merely an on/off device. The partial opening and partial closing of this valve will respectively increase and decrease the amount of flow exiting the nozzle.

Figure 3:
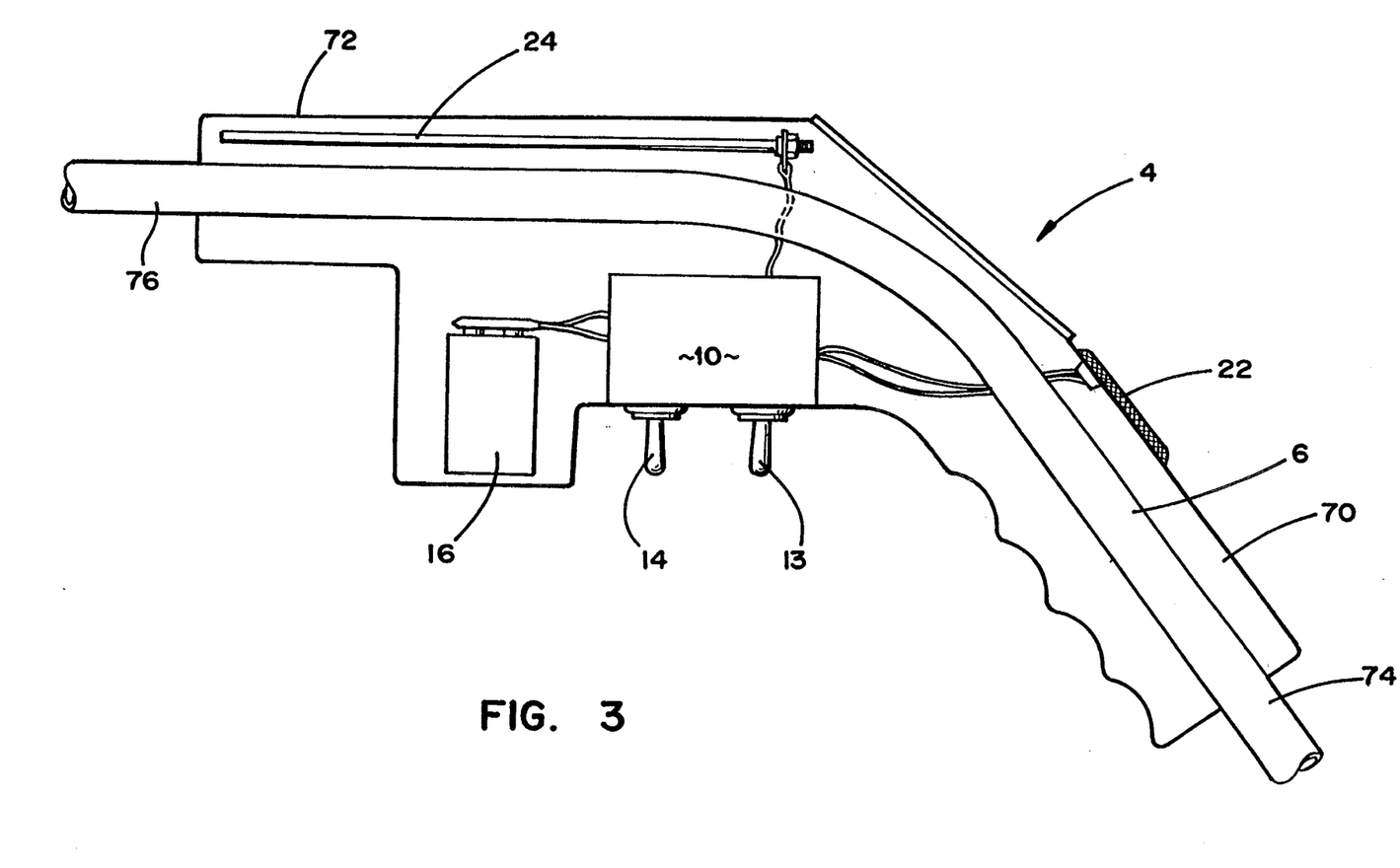
FIG. 3 shows an alternate embodiment of the nozzle handle of FIG. 1 showing a second type of deadman's switch and the antenna fully contained within the top of the nozzle housing.

FIG. 3 provides an alternative embodiment of nozzle housing 4 (as shown in FIG. 1). In this embodiment antenna 18, which was partially exposed in FIG. 2, is replaced by antenna 24 that is entirely contained within handle casing 4. The handle is formed of a radio transmissive plastic. This provides increased safety and reduces the possibility of damage to the antenna. However, housing 4 may reduce the efficiency of transmission which may require more power. FIG. 3 also shows the replacement of finger held deadman's switch 8 and lever 78 with a palm held deadman's switch 22. For sustained operation, deadman's switch 22 provides less fatigue on the operator's hand. However, deadman's switch 8 as show in FIG. 2 allows the possibility of greater operator control over spray force. Switch 14 in FIG. 3 is identical to switch 14 as shown in FIG. 2.

Additionally, switch 12, indicated as a two position on/off switch in FIG. 2, has been replaced by three position switch 13 in FIG. 3. Three position switch 13 may be used to turn the pump on and off (by activating the motor relay) and also to signal primary solenoid 62 to commence operation. In this configuration, deadman's switch 22 is still used to control primary solenoid 62. However, with motor relay 60 still engaged, excessive wear on pump 58 may occur. Accordingly, deadman's switch 22 provides an emergency shut off, while three position switch 13 controls the engagement of motor relay 60.

Figure 4:
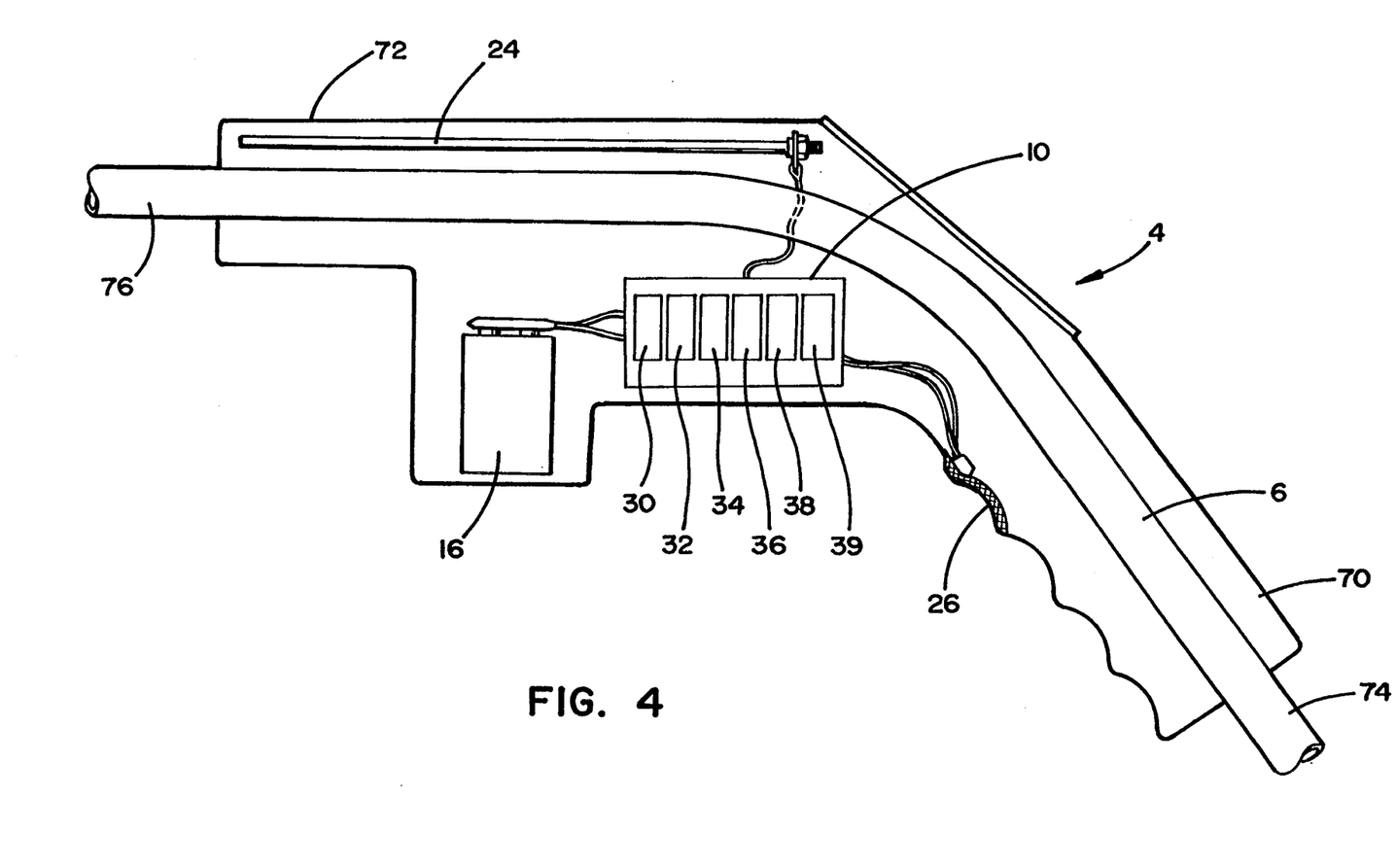
FIG. 4 shows another embodiment of the invention that employs membrane switches for the radio transmitter switches and the deadman's switch, with an increased number of membrane switches providing additional control features.

FIG. 4 provides still another embodiment of nozzle housing 4. In this configuration, switches 12 and 14 from FIG. 2 and switches 13 and 14 from FIGS. 1 and 3 are replaced by membrane switches 30, 32, 34, 36, 38, and 39, which respectively control various functions including: liquid on/off (primary solenoid 62); pump start/stop (motor relay 60); chemical selection (solenoids 63, 64, and 65); and rinse (disengages all chemical solenoids). Additionally, in the FIG. 4 embodiment the deadman's switches of FIG. 2 and FIG. 3 are replaced by a finger operated membrane switch 26.

Figure 5:
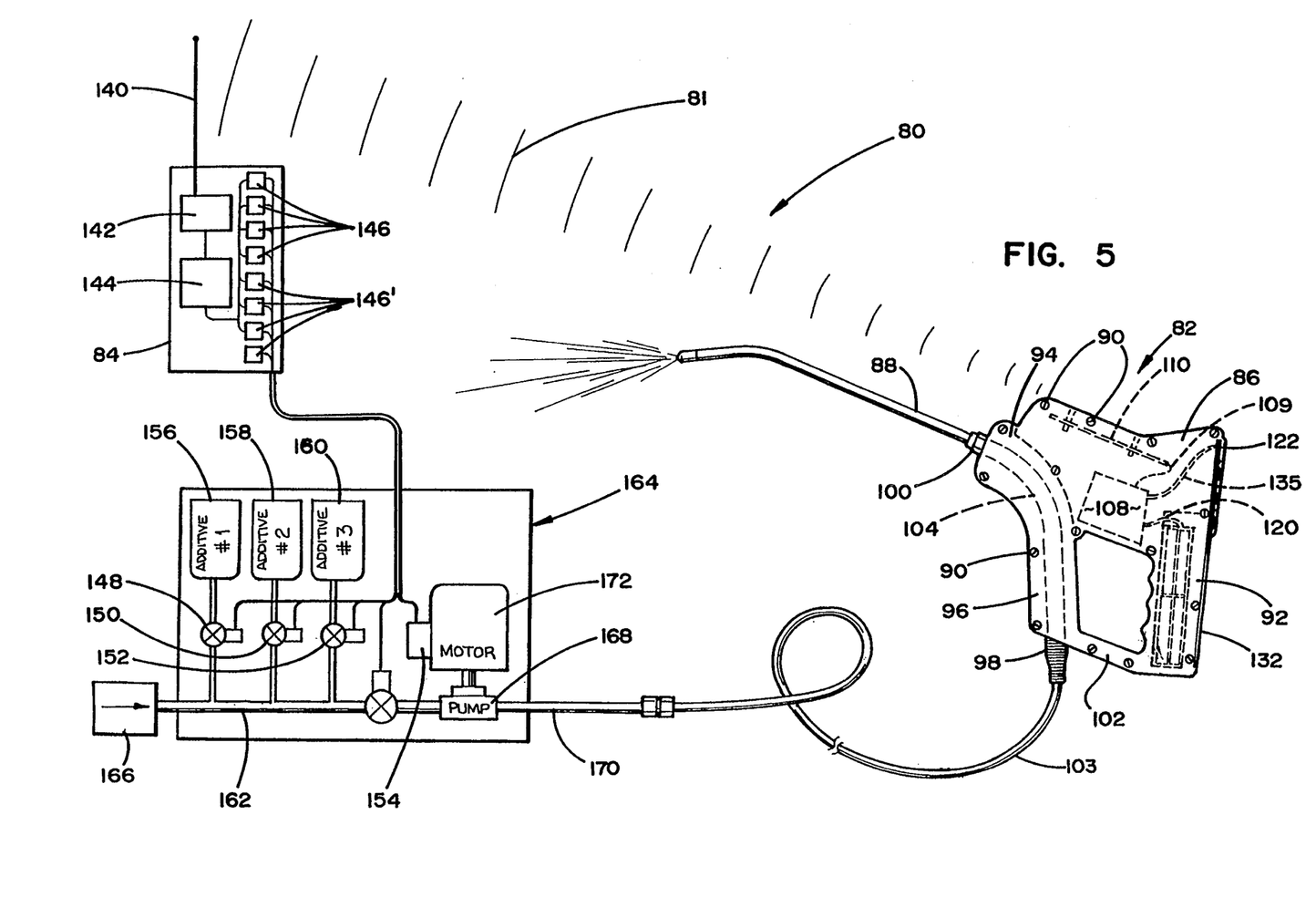
FIG. 5 is a schematic diagram of another and preferred embodiment of the power spraying mechanism of the present invention.
Figure 6:
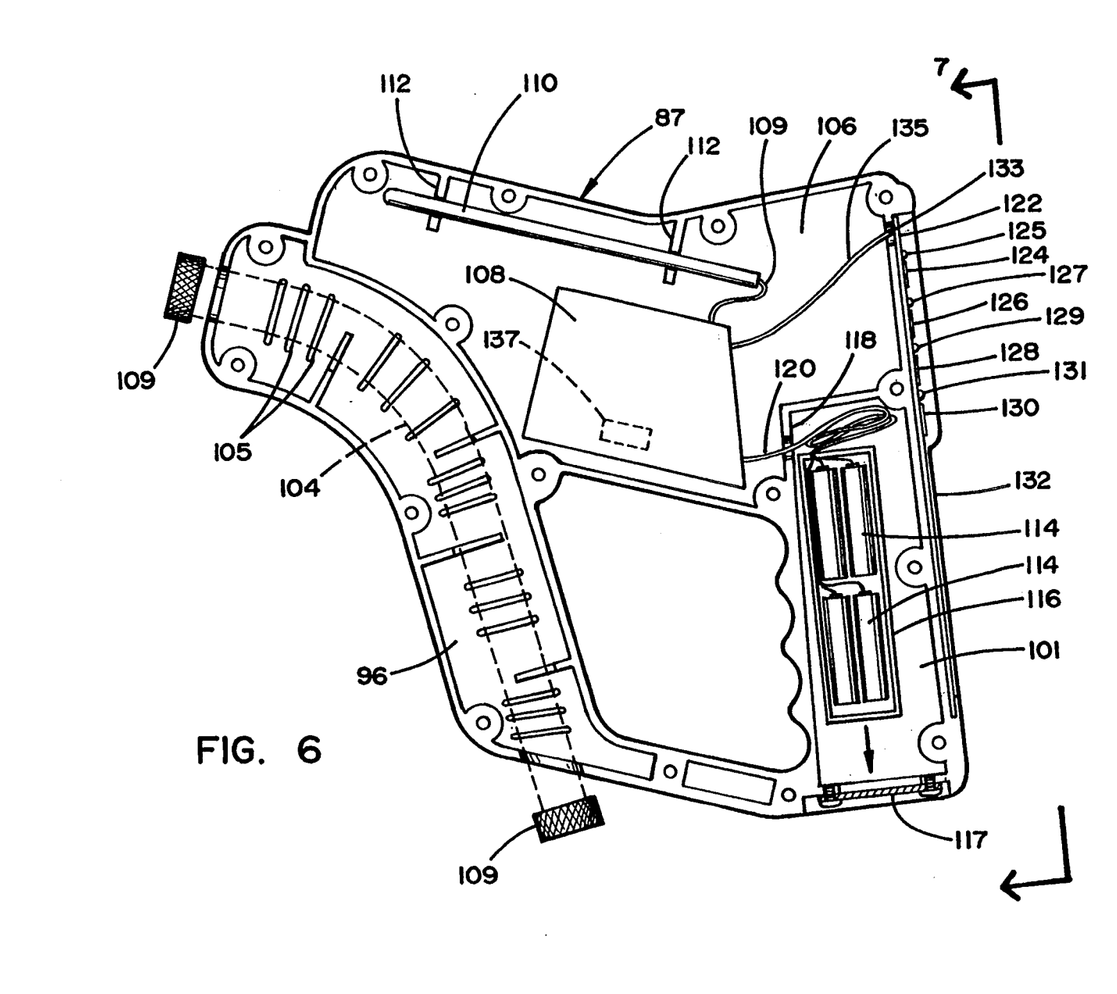
FIG. 6 is an interior side view of one side of the preferred nozzle handle or gun of the embodiment shown in FIG. 5.
Figure 7:
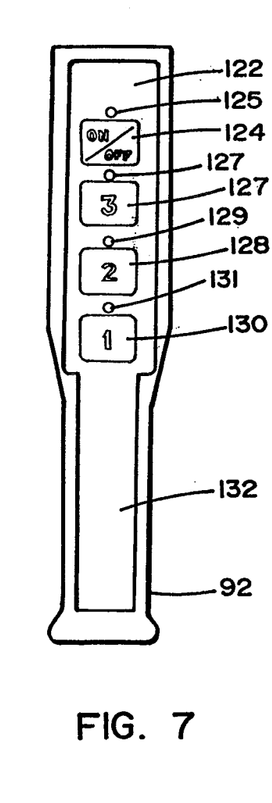
FIG. 7 is an end view gun of FIG. 5 taken from the perspective of line 7—7 of FIG. 6.

Another embodiment 80 of the control mechanism of the present invention is shown FIGS. 5-8. Control mechanism 80 in FIGS. 5-7 comprises a nozzle mechanism 82 and a receiver 84. Nozzle mechanism 82 includes a universal nozzle handle or gun 86 and an optional spray wand 88 that can be attached to the outlet of the gun by a releasable connector. Gun 86 is a hollow plastic housing formed in two halves 87 (FIG. 6 shows one half) which are screwed together by fasteners 90 positioned around the housing. An appropriate seal between the two halves of the housing seals out moisture from the electronic components that are mounted inside the housing. The housing 86 includes a hand grip portion 92 and a barrel portion 94 positioned at an angle with respect to handle 92. A conduit housing 96 is positioned forwardly from the hand grip portion 92 and extends in an arcuate path from a lower or inlet end 98 adjacent the base of the hand grip to an outlet end 100 at the forward or outer end of barrel 94. A stainless steel conduit 104 is positioned in conduit housing 96 and extends between the inlet and outlet ends of the housing, with fittings 109 being provided on the ends of the stainless steel conduit for attaching a hose 103 to the inlet and a spray wand 88 or the like to the outlet. Support arm 102 extends from the lower end of the hand grip portion to the inlet end of the conduit housing to brace the conduit housing.

The conduit housing 96 comprises a separate hollow chamber that is isolated from the hollow interior portion of the barrel and hand grip portions of the handle (see FIG. 6). Electronic components are mounted in separate locations in the barrel and hand grip portions. The isolation of the stainless steel conduit 104 from the electronic components prevents damage from water leakage as well as provides isolation of the electronic components from heat damage due to the flow of hot liquid or steam through the conduit. The conduit housing is provided with a series of spaced slots or perforations 105 in order to provide ventilation for conduit 104 and minimize heat build up.

Gun or handle 86 is formed of a radio transmissive synthetic resin or composite material that is tough and durable. A composite material known as Rynite 530 has been used successfully.

The interior of handle 86 includes not only a conduit housing 96 but includes a battery housing 101 and a separate housing 106 for a circuit board 108 and an antenna 110. The antenna 110 is an elongated rod antenna that is held in place by a pair of spaced flanges 112 which have recesses therein that receive the antenna. Each side 87 of the handle has a pair of flanges 112, so that the antenna is held in place between the corresponding flanges on opposite sides of the handle.

Four AA batteries 114 are mounted in a removable battery cradle 116 positioned in the battery housing. The battery cradle is accessible and removable to change the batteries through a removable battery door 117 screwed on an opening in the base of the hand grip portion. An opening in a wall 118 permits wires 120 from the batteries to pass from the battery housing to the circuit board 108. The circuit board 108 of FIGS. 5 and 6 is a transmitter logic board for a radio control system. Alternatively, the transmitter logic board may be replaced with a relay board 180 (FIG. 8) if the gun is to be used in a system that already has a wired hose remote controller, wherein a conductor 182 in a cable running along the hose is used to convey electrical control signals as opposed to a radio transmissive device.

A flat membrane switch assembly in the form of a single strip 122 fits in a recess in a back side edge of the handle. The relay switch assembly includes four individually actuatable membrane switches 124, 126, 128, and 130 which are positioned above the level of the position where a person's hand grips the handle. The membrane switch also includes a pressure sensitive deadman's switch 132 which is positioned where the person's hand grips the handle, so that the palm of one's hand continuously actuates the deadman's switch. The deadman's switch is designed to be more sensitive than the other switches.

In addition to the individual membrane switches, each membrane switch has an LED light associated with it in order to indicate if the switch is actuated or deactuated. Lights 125, 127, 129, and 131 correspond respectively to switches 124, 126, 128, and 130. The switches can be used for any purpose but desirably are connected so that switch 124 is an on/off switch and switches 126, 128, and 130 are chemical switches for three separate chemicals. These chemicals may be different types of soaps, waxes, or the like. The membrane switches are wired by wires 135 to circuit board 108. The membrane switches are durable and highly water resistant and, importantly, are mounted on an exterior portion of the handle, with only a single opening 133 in the handle covered by the membrane switch strip being provided to convey the leads extending from the membrane switch to the circuit board.

An important feature of the present invention is that the circuit board is not "hard wired" to accommodate only one type of pressure washing system. Rather, the circuit board contains electrical components for different types of systems, and these components are selectively implemented for any particular system by means of a plug replaceable computer microchip 137 (an EPROM) that is programmed for the particular application desired. The gun can be adapted to a different type of pressure washing system simply by replacing the EPROM chip with a chip programmed for that different system.

Another important feature of the present invention is the fact that the antenna is housed completely within the housing of the nozzle handle. There is thus no opening in the nozzle handle through which water can leak into the housing so that they can damage the electronic components therein.

When the gun is used to transmit a radio control signal to a receiver, the circuit board is a transmitter logic board that codes and transmits radio signals 81 to receiver 84 through leads 109 and antenna 110. Signals typically are encoded digitally but they could be encoded tonally instead. Also the transmission frequency of the repetitive signals can be varied so that each receiver can be set up to detect only the signal from the nozzle gun for that receiver. This makes it possible to use multiple guns in proximity to each other.

Figure 8:
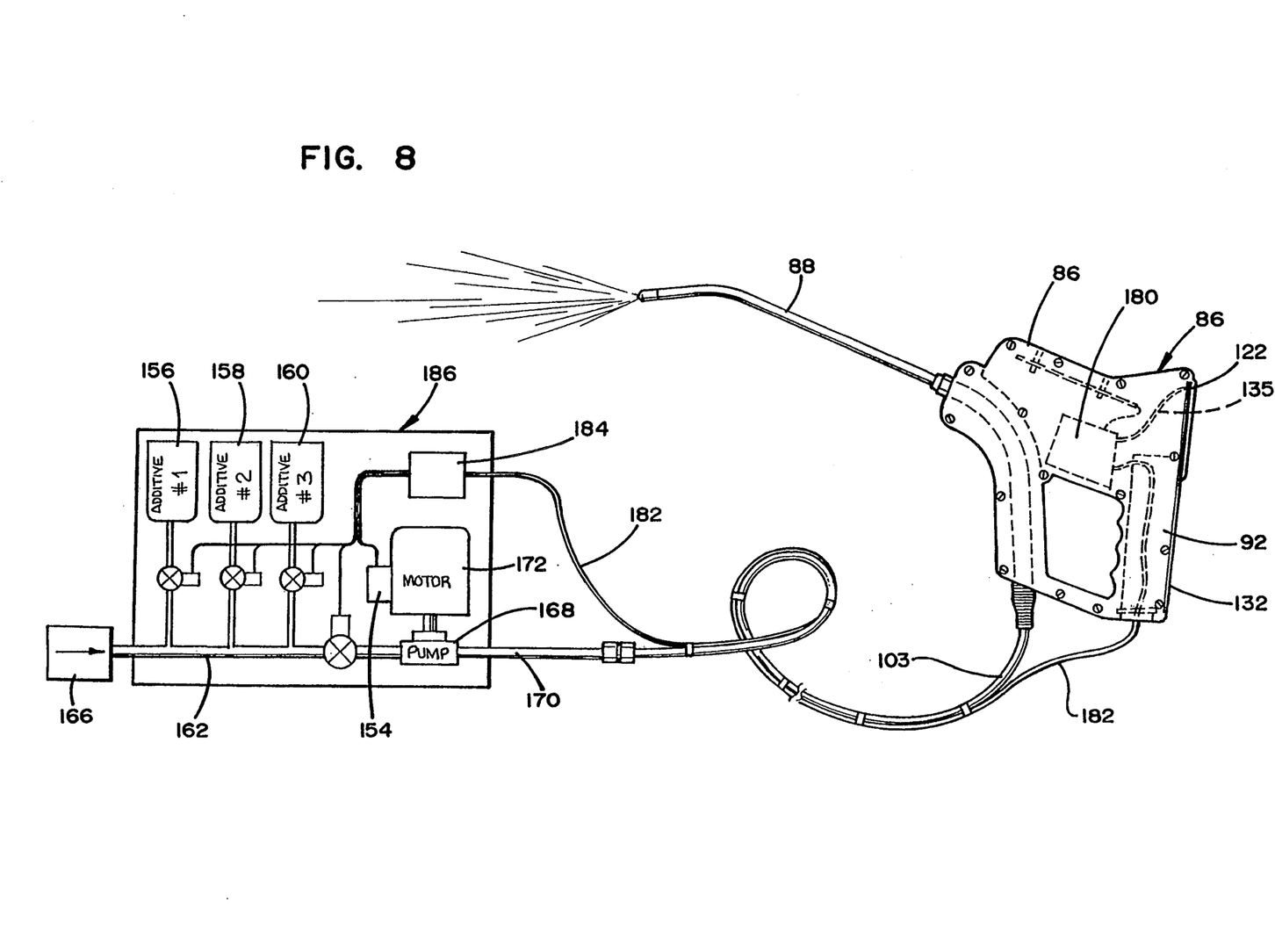
FIG. 8 is a schematic view showing the use of the gun of FIG. 5 with a wired cable system.

In addition to using the present gun for radio control signals, the gun can be used to replace existing nozzle handles on power washer systems wherein switches in the handles are directly connected to in the power supply circuit 184 or to a separate controller in an existing pressure washer 186 at the pressure washer through cables 182 that run along the hose (FIG. 8). This embodiment does not use the radio receiver 84 of FIG. 5 but instead connects directly to the pressure washing equipment being retrofitted with the improved gun of the present invention.

When a wired cable system is being used, the electrical control current that is conveyed to the motor control relay and the chemical additive solenoids in the pressure washer apparatus actually passes through the nozzle switch mechanism. This electrical current is higher than electronic components can withstand so circuit board 180 (which replaces the radio transmitter circuit board 108) incorporates relays that are in turn controlled by the electronic membrane switch. Such relays are mounted on the circuit board so that they can conduct the heavier operating electrical current while permitting the membrane switches to operate on a lower current. The system could use a lower power signal current through the wired cable if the pressure washer includes a controller that converts a control signal to an operating current for the relay and solenoids.

Referring back to FIG. 5 and the radio control module, receiver 84 of the present invention includes an antenna 140 which receives the radio signal from transmitter antenna 110. Signal 81 is then decoded in a decoder section 142 of the receiver and transmitted to a control section 144 of the receiver. Control section 144 actuates selected relays 146, which in turn open and close chemical solenoids 148, 150, and 152 and actuate motor relay 154. Solenoids 148, 150, and 152 are connected in conduits leading from chemical tanks 156, 158, and 160 to liquid conduit 162 of pressure washer 164. Conduit 162 in the pressure washer receives water from a water supply 166 at an inlet thereof and then pressurizes the water with a pump 168 and discharges the water from an outlet 170. The pump is operated by means of an electrical motor 172 which is controlled by motor relay 154. When the motor is deactuated, the pump is turned off and liquid is not pumped through hose 103 leading to the nozzle mechanism. When solenoids 148, 150, or 152 are opened, liquid can flow from the chemical tanks to conduit 162. Liquid is drawn into conduit 162 by gravity or by venturi action in the typical pressure washer.

In the present invention, the receiver can include a number of components in order to make the receiver universally adaptable to almost any pressure washer. The receiver will include a set of normally open relays 146 and a set of normally closed relays 146', so that one or the other set can be employed with pressure washers that require one sort of relay or the other. The micro computer chip 137 employed with the apparatus can be programmed for a particular pressure washer, and all the operator needs to do is to follow the wiring diagram for his specific pressure washer apparatus in order to properly connect the receiver to the pressure washer. The receiver desirably is mounted relatively close to the pressure washer apparatus itself.

An important feature of the present invention is the manner in which control signals are handled by the system. The transmitter in the nozzle handle produces a carrier wave signal that is detected by the receiver, decoded in the decoding section, and converted into control signals in the control section that control selected relays 146. It is an important feature of the present invention that the radio signal 81 is transmitted repetitively to the receiver, and the receiver circuitry is designed to require a continuous signal of this nature. Thus, when the membrane switch is depressed, the state of the membrane signal is transmitted in repetitive signals to the receiver, with each signal being transmitted at repetitions of once every one-half to five seconds and preferably once every second. If the state of the membrane switch changes or if the transmission stops (by the operator releasing the deadman's switch for example), the receiver then generates a control signal deactuating the pressure washer. The status lights or LED lights on the handle generate visible pulsing signals each time a transmission signal is generated. The pulsing lights conserve energy, as does the pulsing signal, and thus prolongs battery life.

The continuously repeating signals provide some significant advantages. In the event that the receiver does not detect one control signal, subsequent signals can be detected by the receiver. Thus, occasional interruptions in transmission by the presence of obstructions or the position of the nozzle or any other possible interruption medium will not cause the control signal to be lost but merely received at a slightly later time. Moreover, the failure to receive a turn off signal, as when the unit is turned off or the deadman's switch is released, will not cause the apparatus to stay on indefinitely or to require an additional actuation of a switch. Rather, as soon as the receiver fails to receive the signal indication that the deadman's switch is still actuated, the system will automatically shut down. The continuous or repeating signal of the present invention makes it possible to employ an electronic membrane switch (which is a pulse type of switch) and a radio control nozzle handle instead of a direct wired control switch for a deadman's control.

The circuitry of the present invention also is designed to provide additional features. One important feature is that when the deadman's switch is released, the circuit includes a delay mechanism that delays the shut off of the system for about one to five seconds, preferably about three seconds. Thus, the nozzle handle can be switched from hand to hand without deactuating the control mechanism each time the membrane switch is disengaged.

Another feature of the present invention is that when the deadman's switch is disengaged, it can be reactuated simply by re-engaging the deadman's switch within a limited period of time after deactuation of at least about five seconds and preferably 30 to 60 seconds. After 30 seconds, if the deadman's switch has not been reactuated, the entire system resets and cannot be restarted again simply by actuating the deadman's switch. Thus, for a period of time, the deadman's switch can be used as a trigger or on/off switch simply by pressing and releasing the deadman's switch. When the entire system shuts down after a non-actuation period of 30 seconds, the circuitry causes all of the switches to reset to an off position. Thus, the deadman's switch needs to be depressed and, in addition, the on/off switch 124 needs to be depressed. This can be done with the thumb of the opposite hand once the handle is being held. Once the system is actuated by pressing the deadman's switch and actuating the on/off switch, the system remains actuated until deactuated, and a continuous pulsing signal shows the state of the system through light 125.

The chemical switches 126, 128, and 130 can be actuated simply by pressing the desired switch. Each switch can be turned off by pressing the switch a second time or by pressing a different chemical switch. Only one chemical switch can be actuated at one time, so pressing a new chemical switch automatically shuts off the previous chemical switch and turns on the new chemical switch.

The present invention not only provides a highly sophisticated radio controlled hose nozzle that is useful for specifically designed radio controlled apparatus, but it also provides a universal control gun that can be used with virtually any existing pressure washer system. By controlling the entire apparatus through software controls implemented by a programmable micro chip, it is not necessary to change the hard wiring of any system to use the present invention. The receiver even has alternative control signals of 12 volts DC or 24 volts AC, which can be selected to control pressure washers requiring one type of control signal or the other.

It should be understood that the foregoing is merely exemplary of the preferred practice of the present invention and that various changes may be made in the arrangements and details of construction of the embodiments disclosed herein without departing from the spirit and scope of the present invention, which is defined in the appended claims.

I claim:

1. A radio operated control mechanism for operating a pressure sprayer, wherein the pressure sprayer comprises a motor driven pressure pump mechanism that receives liquid from a liquid source and pumps the liquid under pressure through a hose to a hand held nozzle, the control mechanism including:
- a nozzle housing for the nozzle formed in the shape of a handle with a barrel portion and a hand grip portion;
- a liquid conduit mounted in the nozzle housing and having an inlet and an outlet, the outlet facing outwardly from an outer end of the barrel portion;
- a plurality of manually actuatable electronic switches mounted in the nozzle housing in position for manual actuation by a user while the user holds the nozzle housing by the hand grip, the switches including:
  - a deadman's switch that is actuated only when a user is holding the nozzle housing by the hand grip, the deadman's switch automatically becoming deactuated when the hand grip is released; and
  - a liquid on/off switch;
- a radio transmitter and power supply therefor mounted in the nozzle housing in electrical contact with the switches, the radio transmitter generating continuing output signals comprising a carrier wave encoded with control information representative of the state or change of state of each of the switches;
- an antenna mounted to the nozzle housing and being connected with the transmitter to transmit the output signals from the antenna as airborne electromagnetic signals;
- a radio receiver in electrical communication with the pressure pump mechanism, the radio receiver receiving the airborne electromagnetic signals transmitted from the antenna and converting the signals into electrical control signals that control the operation of the pump mechanism;
- electrical controls connected to the pump mechanism in communication with the radio receiver, the electrical controls including a switch that controls the actuation of the pump, the electrical controls receiving the control signals from the receiver and operating the pump mechanism in response thereto;
- the control mechanism being such that it deactuates the pump when the deadman's switch is released or the on/off switch is deactuated or when the receiver fails for a predetermined period of time to detect a continuing signal indicating that the deadman's switch continues to be actuated, the control mechanism causing the pump to be actuated only while the receiver continues to receive a signal indicating that both the deadman's switch and the liquid on/off switch are actuated.

2. A control mechanism according to claim 1 wherein the deadman's switch is a membrane switch positioned on the hand grip so as to be actuated when the hand grip is being held in the hand of an operator.

3. A control mechanism according to claim 2 wherein the transmitter generates repetitive output signals and the receiver causes the electrical controls to shut off the pump if the repetitive signal is not received for a predetermined period of time, the period of time being long enough so that an operator can release the hand grip long enough to change hands on the hand grip without deactuating the pump.

4. A control mechanism according to claim 3 wherein the deactuation is delayed by up to five seconds after the deadman's switch is released.

5. A control mechanism according to claim 4 wherein the deactuation is delayed for about three seconds.

6. A control mechanism according to claim 1 wherein the on/off switch remains actuated for a second predetermined period of time after the deadman's switch is released and thereafter the on/off switch is automatically reset to the off position, making it possible to use the deadman's switch as a trigger to turn the pump on and off unless the delay in turning the pump back on exceeds the second predetermined period of time, in which case the on/off switch has to be turned to its on position in addition to reactuating the deadman's switch in order to reactuate the pump.

7. A control mechanism according to claim 6 wherein the second predetermined period of time is in excess of five seconds.

8. A control mechanism according to claim 7 wherein the second predetermined time is at least about thirty seconds.

9. A control mechanism according to claim 1 wherein the pressure sprayer includes one or more chemical additive tanks that contain chemicals and includes chemical control means for each tank for selectively adding the chemicals to the liquid being pumped by the pump, the nozzle housing including separate electronic switches that actuate the individual chemical control means so as to select the chemicals to be added to the liquid.

10. A control mechanism according to claim 1 wherein the nozzle housing includes a sealed interior compartment for the radio transmitter that is separated from the liquid conduit such that heat and liquid leakage from the liquid conduit does not adversely affect the electronic components of the transmitter.

11. A control mechanism according to claim 10 wherein the radio transmitter and antenna are mounted in a sealed internal chamber in the nozzle housing and the liquid conduit is mounted in a separate liquid conduit chamber in the housing that bypasses the internal chamber in which the radio transmitter and antenna are located, the liquid conduit housing being ventilated to provide cooling for the liquid conduit inside the conduit housing.

12. A control mechanism according to claim 1 wherein the radio transmitter, antenna, and power supply are mounted in at least one sealed chamber entirely inside the nozzle housing, the portion of the nozzle housing adjacent the antenna being radio transmissive.

13. A remote control mechanism for operating a pressure sprayer, wherein the pressure sprayer comprises a motor driven pressure pump mechanism that receives liquid from a liquid source and may receive selected additives from additive sources and pumps the liquid and selected additives under pressure through a hose to a hand held nozzle, the control mechanism including:
- a nozzle housing for the nozzle formed with a barrel portion and a hand grip portion, with the nozzle housing having an interior chamber for electronic components that is sealed against water penetration;
- a liquid conduit mounted in the nozzle housing and having an inlet and an outlet, the outlet facing outwardly from an outer end of the barrel portion;

a plurality of manually actuatable electronic membrane switches mounted in the nozzle housing in position for manual actuation by a user while the user holds the nozzle housing by the hand grip, the switches including:
   a deadman's switch that is actuated only while an operator is holding the hand grip; and
   a liquid on/off switch;
electrical control switches mounted in the interior chamber in the nozzle housing in electrical communication with the membrane switches, the electrical control switches generating output signals representative of the state or change of state of each of the membrane switches, the electrical control switches including relays that are connected so as to be actuated by the membrane switches;
an electrical power supply means in the pressure washer in communication with the pressure pump mechanism for supplying actuating power to the pump, the pump including electrical switch means for turning the pump on when power is supplied to the electrical switch; and
a wired cable interconnecting the electrical switches with the electrical power supply means such that the load current from the electrical power supply means passes through the relays actuated by the membrane deadman's switch and the membrane on/off switch to actuate the pump, the membrane switches turning the relays on and off to turn the load current on and off without requiring that the load current flow through the membrane switches.

14. A remote control mechanism according to claim 13 wherein the pressure washer includes a plurality of chemical additive supply means and electrical chemical control switches that cause the introduction of the individual chemicals into the liquid when power is supplied to them, the electrical control switches in the nozzle housing including a switch connected to each of the electrical chemical control switches so as to control the supply of power to the chemical control switches and thereby control the addition of chemicals to the liquid.

* * * * *